May 17, 1932.   M. M. GUGGENHEIM ET AL   1,859,205
CONFECTIONERY
Filed Jan. 28, 1930   3 Sheets-Sheet 2
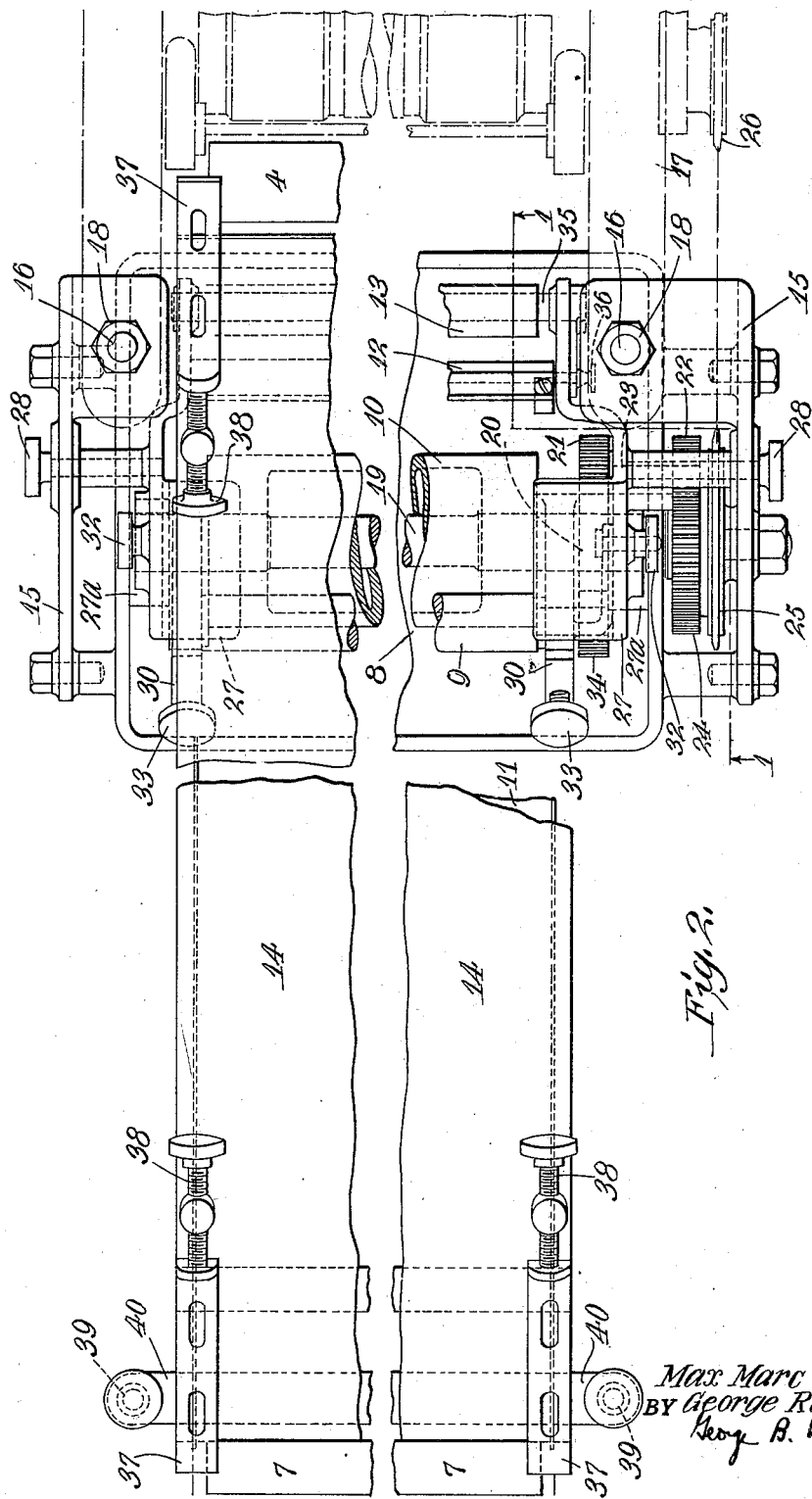
INVENTOR
Max Marc Guggenheim
BY George Ralph Baker
George B. Willcox
ATTORNEY May 17, 1932.  M. M. GUGGENHEIM ET AL  1,859,205
CONFECTIONERY
Filed Jan. 28, 1930  3 Sheets-Sheet 3
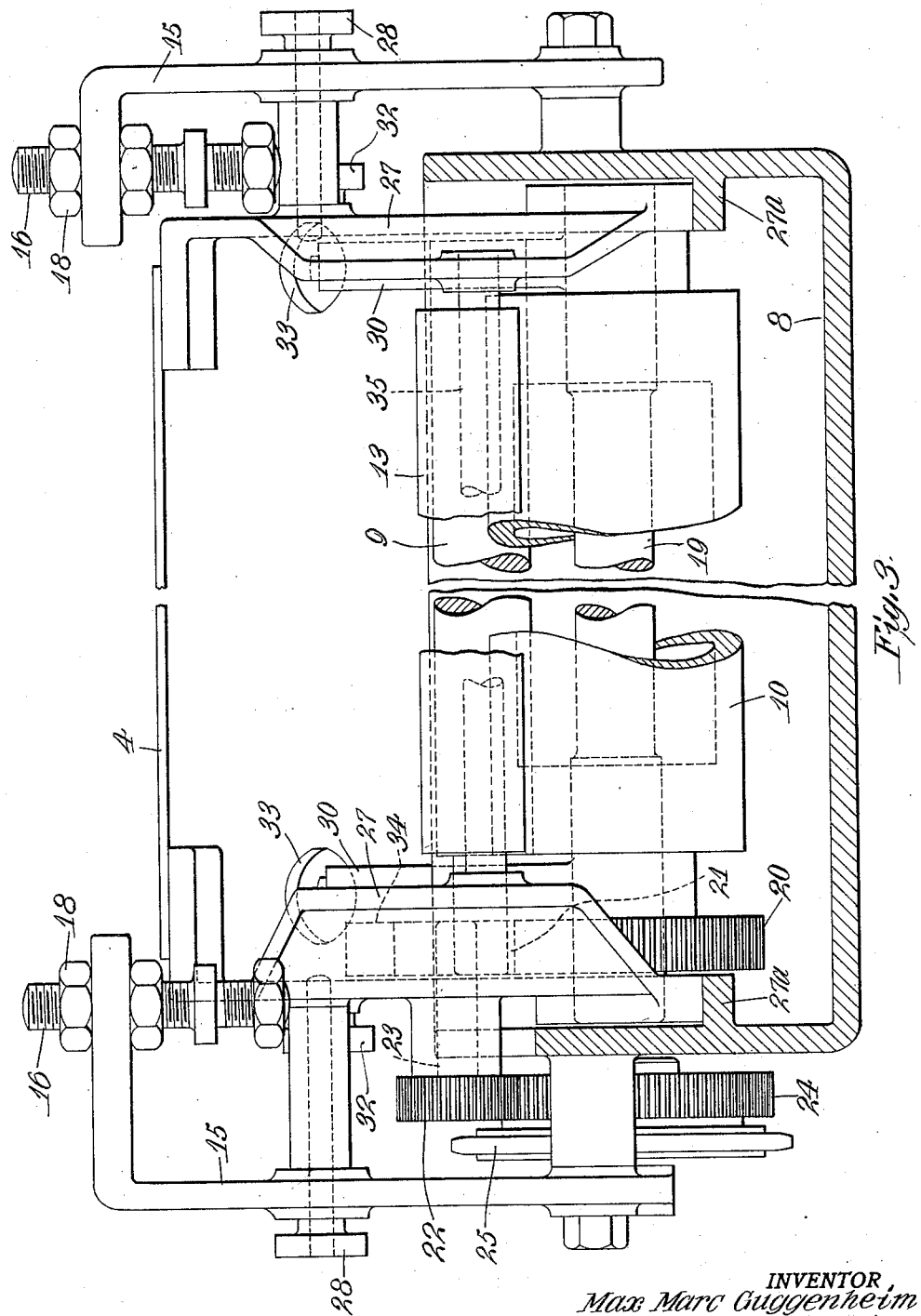
INVENTOR,
Max Marc Guggenheim
BY George Ralph Baker
George B. Millerp
ATTORNEY Patented May 17, 1932

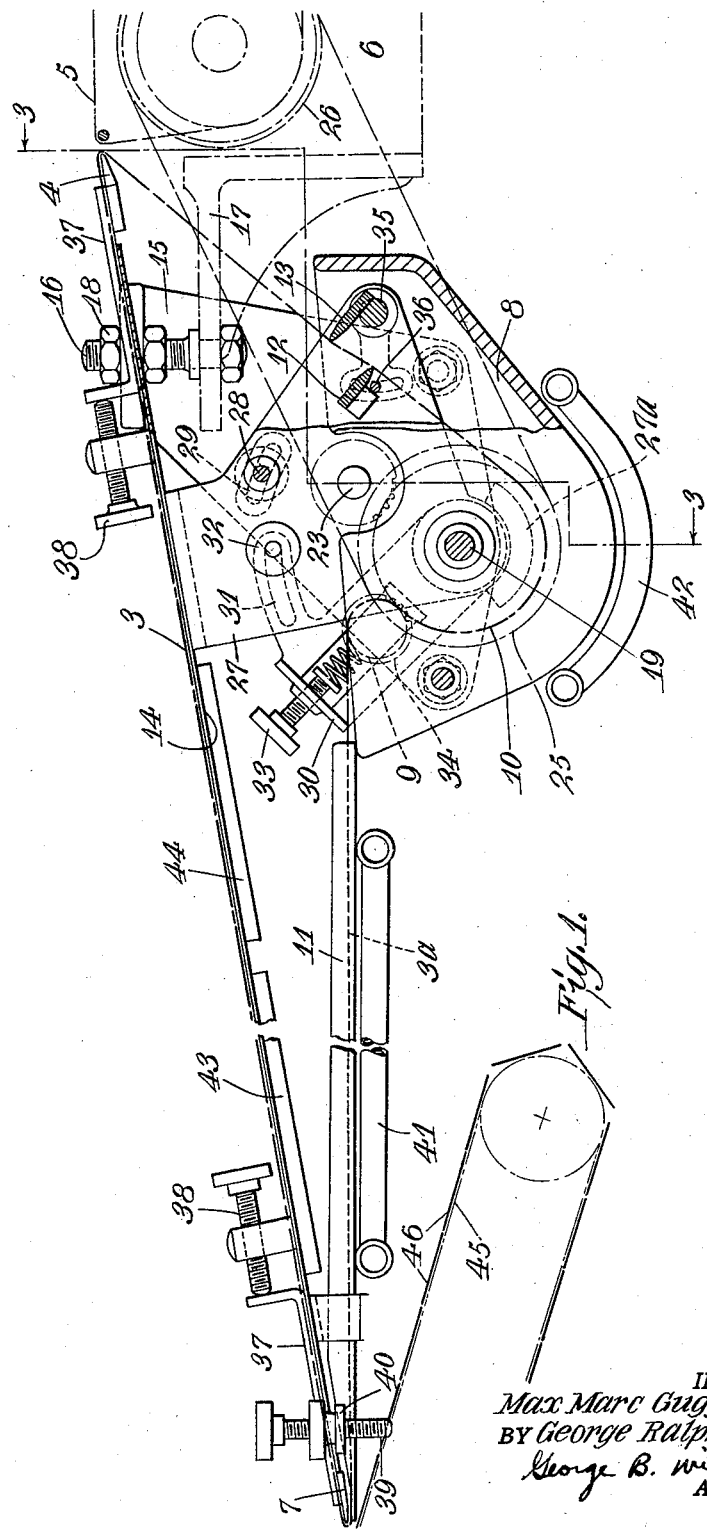

1,859,205

UNITED STATES PATENT OFFICE

MAX MARC GUGGENHEIM, OF SAGINAW, MICHIGAN, AND GEORGE RALPH BAKER, OF WILLESDEN, LONDON, ENGLAND, ASSIGNORS TO BAKER PERKINS COMPANY, INC., OF SAGINAW, MICHIGAN, A CORPORATION OF NEW YORK

CONFECTIONERY

Application filed January 28, 1930, Serial No. 424,120, and in Great Britain January 30, 1929.

This invention relates to a method and means for delivering chocolates from a chocolate coating machine to suitable trays or collecting devices.

The object is to provide an improved method of treating coated chocolates and improved means for discharging them, whereby discharge is carried out with the minimum of manipulation, rendering unnecessary the use of paper sheets for the collection of the goods.

The freshly coated chocolates are received upon a traveling surface rendered neutral by a coating or impregnation of tempered chocolate. Such surface preferably passes through zones of decreasing, and if required, increasing temperatures and discharges upon a receiving conveyor element which travels at suitable speed in a direction substantially in alinement with the direction of movement of the said tempered surface.

According to the present invention, an endless transfer conveyor of linen, silk or other suitable material receives the chocolates as they arrive from a coating mechanism via the usual wire belt. The transfer conveyor discharges the chocolates over a fine knife edge. The return lap of the conveyor is immersed in a tempering bath of chocolate and is thereby coated and impregnated with chocolate. A scraper is provided to adjust the thickness of the layer of chocolate and thereby establish a desired surface quality of the conveyor as it passes for the reception of the chocolates.

The chocolates are delivered by the transfer conveyor onto a tray-conveyor or endless steel conveyor, or upon a conveyor comprising or covered with paper bands. Where trays are used the conveyor may be arranged to maintain the trays in a horizontal or in an upwardly inclined position so that the chocolates leaving the transfer conveyor are kept in a position suited to their setting in uniform shape.

Another feature of the invention is the depositing of coated chocolates directly onto rigid trays. For this purpose the trays are warmed prior to the delivery of the goods and the tray surface is kept quite dry. The trays are cooled after depositing and are then subjected to vibration or knocking to loosen the goods for removal.

In the accompanying drawings Fig. 1 is an elevation partly in section, of an apparatus according to the invention.

Fig. 2 is a corresponding plan.

Fig. 3 is a transverse section on line 3—3 of Fig. 1.

In carrying the invention into effect according to one convenient mode, an endless conveyor band 3 of silk, linen or other suitable material is supported upon a convenient guide member or blade 4 which is located adjacent the usual wire belt 5 that delivers freshly coated pieces from a chocolate coating mechanism 6. The blade 4 extends in a plane in continuation of the wire belt toward a delivery position where the conveyor band 3 passes over a blade edge 7. The return lap 3a of the conveyor is guided over the edge of a chocolate bath 8 (which may be jacketed), by means of a roller 9 and thence passes through the chocolate by the aid of a roller 10 of comparatively large diameter. Roller 10 may also serve to drive the transfer conveyor band.

The driving of band 3 may, if desired, be aided by the roll 9, which is spring loaded and driven positively in synchronism with the main driving roll 10.

A plate or chute 11 is arranged from the lip of bath 8 towards knife edge 7 to collect any chocolate which may drip from the conveyor band and to drain it back into the bath. On the egress run of the band from the chocolate bath a scraper device is provided, comprising a pair of blades 12, 13 upon opposite sides of the band. The coat of chocolate adhering to the band may thereby be adjusted to a predetermined appropriate thickness. The scrapers may leave a thin layer or coat upon one or both sides of the band, or they may deprive the band of a discernible coat of chocolate, leaving it sufficiently impregnated to present a non-setting surface to the chocolates received from the coating plant.

Preferably the conveying lap of the transfer band passes over a table 14 to support the conveyor when loaded with chocolates. Table 14 may afford a mounting both for the forward guide knife 4 adjacent the chocolate delivery wire 5 and for the knife edge 7. At the delivery end, table 14 may itself terminate in a blade having a thin rounded marginal end around which the band runs.

During the passage of the chocolates along the transfer conveyor they may be treated in zones of different temperatures, for example, heating means, such as a water jacket may be provided under the table, adapted to keep the chocolates warm in the early stages as they move along the transfer conveyor, and means may also be provided for gradually lowering their temperature as they proceed further along the transfer conveyor to discharge at the blade edge.

Alternatively, cooling may be effected in the first stage followed by a short period of rather intense heating to remelt a thin layer so that the goods will easily detach themselves from the band.

The chocolate bath 8 is carried by side cheeks 15 supported upon bolts 16 on a bracket 17 associated with the coating plant 6. Vertical adjustment of the side cheeks relatively to the coating plant is effected by means of nuts 18.

Driving roller 10 is mounted on a spindle 19 that rotates in bearings in side plates 27 within the chocolate bath 8. The spindle 19 is provided with a gear wheel 20 with which meshes one of a pair of pinions 21, 22 mounted on a spindle 23. The outer pinion 22 gears with a spur-wheel 24 that is connected to a chain wheel 25 driven from a chain wheel 26 associated with the coating plant.

The side plates 27 are supported on two concave saddles 27a attached to the inside of the chocolate bath 8. The transfer conveyor unit moves pivotally about the axis of the spindle 19 when the table is adjusted by means of screws 39. Screws 28 are threaded in the plates 27 and work in arcuate slots 29 in the outer plates 15, holding the plates 27 down to resist the driving thrust of the gears 22 and 24. By withdrawing the screws 28, the band, supporting table, rolls, scrapers and driving gear are left free for lifting out.

Guide roller 9 is carried in sliding bearings in plates 30 which are pivotally mounted on spindle 19. Plates 30 have slotted arms 31 that engage clamping screws 32 carried by the plates 27. Roller 9 may thereby be adjusted to alter the tension of the band 14. The roller 9 is pressed against the roller 10 by tension of the springs when suitably adjusted by the screws 33. The conveyor band 3, being thin, is propelled without danger of strain or tearing, by being yieldingly clamped between the positively driven rollers 10 and 9. The roller 9 is provided with a pinion 34 meshing with and driven by the gear wheel 20.

The scrapers 12 and 13 are carried by the plates 27, scraper 12 preferably being fixed. Scraper 13 is carried by a pivotally mounted rod 35 that is held in adjusted position by the clamping screw 36.

The blades 4 and 7 are preferably supported by bars 37 which are slidably mounted upon the table 14. Adjusting screws 38 are provided whereby the blades may be adjusted longitudinally on the table. At its forward end the table is provided with adjustable supporting screws 39 carried by a transverse bar 40 to enable it to be supported from a suitable support.

Heaters 41, 42 are provided for the bath and chute 8 and 11 respectively, and tempering baths 43, 44 for the table.

In practice, the chocolates are received from transfer conveyor 3 onto another conveyor (not shown) which passes them into a cooling chamber so they may be conveniently collected when they are in appropriate condition. According to one form, an inclined endless conveyor 45 which may be provided with, for example, metallic rigid tray elements 46, is arranged so that the chocolates are received on the tray elements which are only slightly inclined to the direction of the path of the chocolates as they pass along the transfer band. The blade delivering edge 7 of the transfer conveyor 3 causes transfer of the chocolates evenly and without subjecting them to shock or other treatment liable to damage their coating or shape. The thinness of the blade edge causes the chocolate coated piece to leave the conveyor band suddenly, yet without shock. The quick separation prevents formation of tails.

Having thus described our invention, what we claim and desire to secure by Letters Patent is:

1. Apparatus for discharging chocolates from a coating machine, comprising an endless transfer conveyor band, of fibrous material permeable by melted chocolate, adapted to receive the chocolates from the coating machine, means for guiding a lap of the transfer conveyor band in immersed relationship with a tempering bath of chocolate and means engaging the band after emerging from the bath adapted to gauge the thickness of the chocolate coat on the band prior to the depositing of the goods on the band.

2. Apparatus for discharging chocolates from a coating machine, comprising an endless transfer conveyor formed of thin permeable fabric, and adapted to receive the chocolates from the coating machine, such conveyor being impregnated with tempered chocolate prior to the depositing of the previously chocolate-coated goods on the band, whereby breaking of the bottom coating and tailing are avoided during such transfer.

3. Apparatus for discharging chocolates from a coating machine, comprising an endless transfer conveyor adapted to receive the chocolates from the coating machine, such conveyor being rendered neutral by a coating or impregnation of tempered chocolate, means for guiding a lap of the transfer conveyor in immersed relationship with a tempering bath of chocolate, said means including a driving roller located within the bath, a table pivotally mounted for limited angular movement about the axis of said driving roller, said table supporting said transfer conveyor.

4. Apparatus as set forth in claim 3 wherein a spring pressed tension roller is provided, said roller geared to the driving roller and bearing against the same.

5. Apparatus as set forth in claim 3 wherein longitudinally adjustable knife edges are provided at the extremities of the table.

6. Apparatus for discharging chocolates from a coating machine comprising an endless transfer conveyor adapted to receive the chocolates from the coating machine, such conveyor being rendered neutral by a coating or impregnation of tempered chocolate and heat control means located beneath a run of the conveyor and positioned to subject the chocolates during their passage on the conveyor to zones of varying degrees of temperature, substantially as described.

In witness whereof we affix our signatures.

MAX MARC GUGGENHEIM.
GEORGE RALPH BAKER.